United States Patent
Autenrieth et al.

(10) Patent No.: US 7,025,941 B1
(45) Date of Patent: Apr. 11, 2006

(54) REACTOR SYSTEM WITH ELECTRIC HEATING MEANS

(75) Inventors: Rainer Autenrieth, Grossbottwar (DE); Andreas Docter, Ulm (DE); Norbert Wiesheu, Guenzburg (DE)

(73) Assignee: DaimlerChrysler AG, Stuttgart (DE)

( * ) Notice: Subject to any disclaimer, the term of this patent is extended or adjusted under 35 U.S.C. 154(b) by 656 days.

(21) Appl. No.: 09/664,539

(22) Filed: Sep. 18, 2000

(30) Foreign Application Priority Data

Sep. 17, 1999 (DE) ................ 199 44 540

(51) Int. Cl.
*F28D 7/00* (2006.01)
*B01J 8/00* (2006.01)

(52) U.S. Cl. .................. 422/198; 422/199; 48/127.9; 48/127.1; 423/648.1; 423/649; 423/650; 423/651

(58) Field of Classification Search ............. 422/198, 422/199; 48/127.9, 127.1; 423/648.1, 649, 423/650, 651
See application file for complete search history.

(56) References Cited

U.S. PATENT DOCUMENTS

| 3,982,910 A | 9/1976 | Houseman et al. ........... 48/116 |
| 4,112,876 A | 9/1978 | Mentschel |
| 5,417,062 A | 5/1995 | Swars et al. ................. 60/300 |
| 6,641,795 B1 * | 11/2003 | Abe ........................ 423/648.1 |

FOREIGN PATENT DOCUMENTS

| DE | 33 45 958 A1 | 12/1983 |
| DE | 693 02 902 T2 | 3/1993 |
| DE | 195 26 886 C1 | 7/1995 |
| DE | 196 39 150 A1 | 9/1996 |
| EP | 0 757 968 A1 | 2/1997 |
| EP | 0 913 357 A1 | 5/1999 |
| EP | 0920064 | 6/1999 |
| EP | 0 967 174 A1 | 12/1999 |
| JP | 58 219975 (A) | 12/1983 |
| JP | 3-218902(A) | 6/1991 |
| JP | 07315802 A | 12/1995 |

OTHER PUBLICATIONS

Search Report.

* cited by examiner

*Primary Examiner*—Glenn Caldarola
*Assistant Examiner*—Alexis Wachtel
(74) *Attorney, Agent, or Firm*—Crowell & Moring LLP

(57) ABSTRACT

A reactor system for reacting a hydrocarbon or hydrocarbon derivative charging material comprises a catalyst-coated reaction chamber, to which a reaction educt stream can be fed through a reaction chamber inlet, and electric heating means. The reaction chamber inlet has a flat, electrically heatable, catalyst-coated, and reaction educt stream-permeable heater, which covers at least partially the inlet cross section of the reaction chamber inlet and through which the educts for reacting the charging material can be fed at least in a start operating phase of the reactor system. An electric heater may be provided in front of the reaction chamber inlet, for the purpose of heating at least one reaction educt in a start operating phase and there are means for point-by-point injection of at least one reaction educt, heated in the heater, into the reaction chamber.

5 Claims, 3 Drawing Sheets

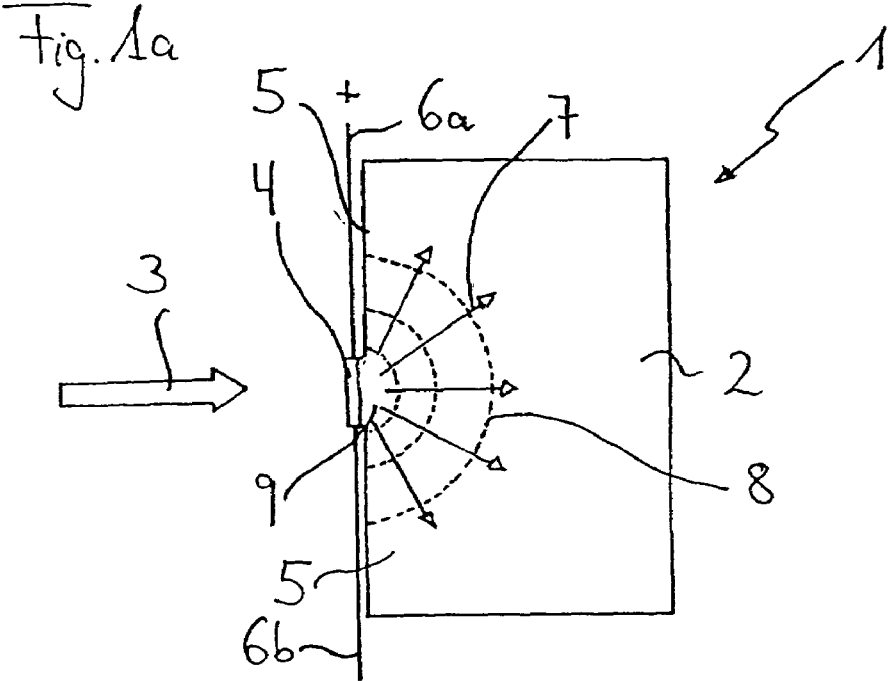
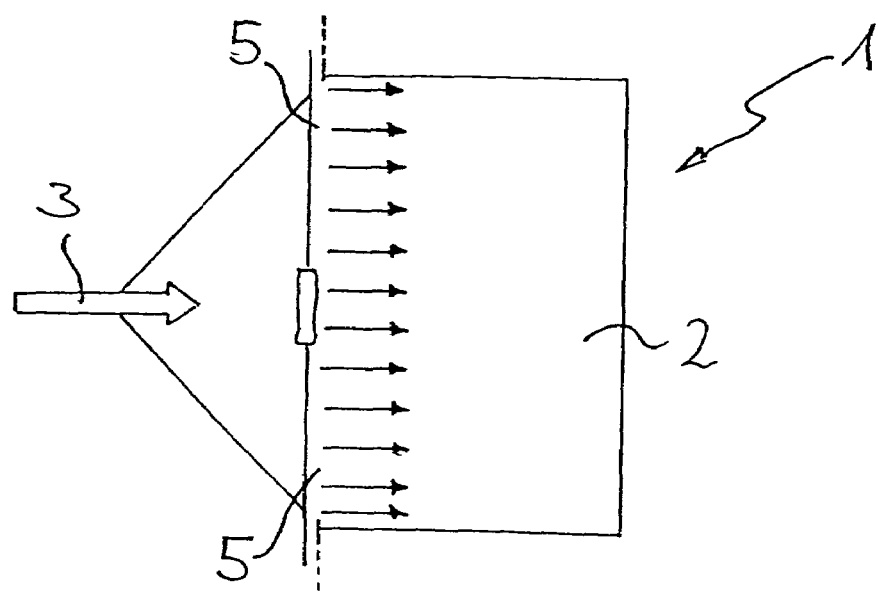

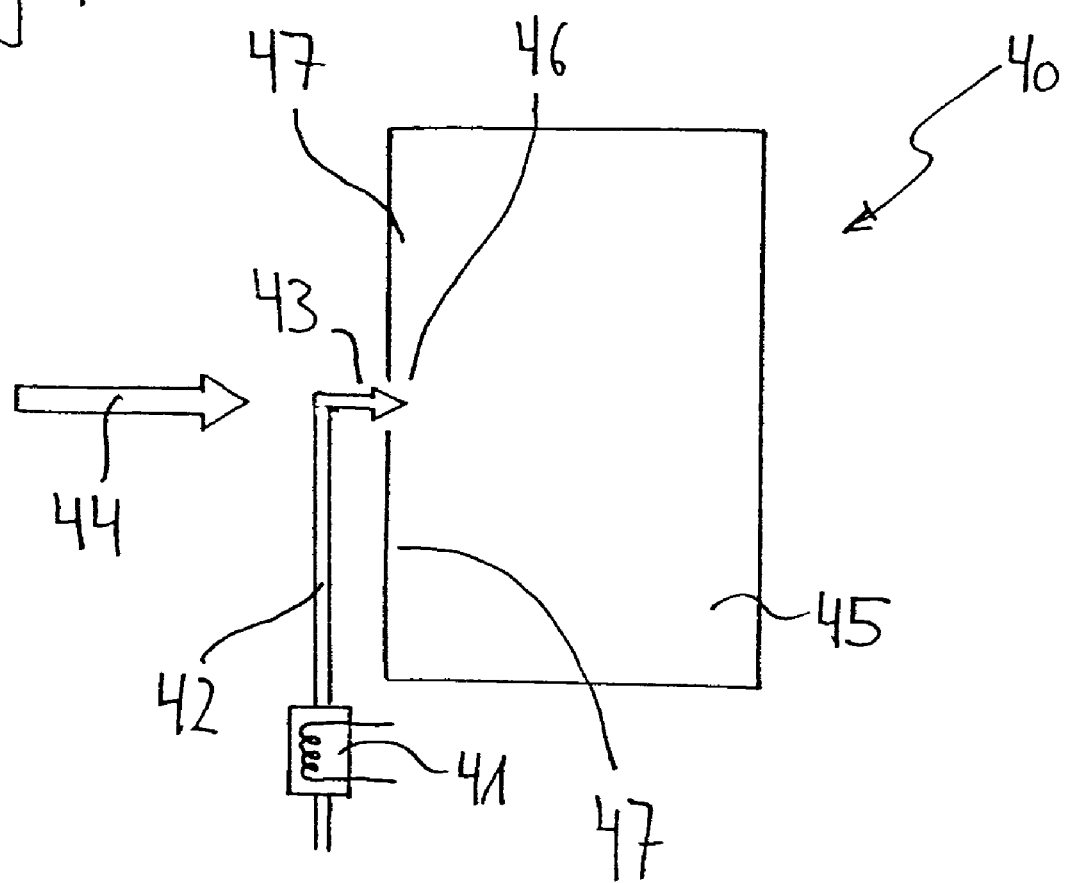

REACTOR SYSTEM WITH ELECTRIC HEATING MEANS

BACKGROUND AND SUMMARY OF THE INVENTION

This application claims the priority of German patent document 199 44 540.0, filed 17 Sep. 1999, the disclosure of which is expressly incorporated by reference herein.

The invention relates to a reactor system, for reacting a hydrocarbon or hydrocarbon derivative charging material, having a catalyst-coated reaction chamber, to which a reaction educt stream can be fed through a reaction chamber inlet, and electric heating means.

European patent document EP 0 757 968 A1 describes a reforming reactor for catalytic combustion of methanol and oxygen or oxygen-containing gas in a reaction chamber. For the catalytic combustion, the reaction educts are fed to an internal region of the reaction chamber through a supply channel, projecting into the interior of the catalyst-filled reaction chamber. In the region of the opening of the supply channel in the interior of the reaction chamber there is an electric heating coil, with which in the warmup operating phase catalyst material, located at the opening, can be raised rapidly to a temperature suitable for the catalytic reaction. Reaction educts, which flow through the opening of the supply channel into the reaction chamber, are heated by the exothermic reaction in the vicinity of the heating coil, thus heating the other areas of the reaction chamber. After a startup operating phase, when a desired operating temperature has been reached in the whole reaction chamber, the heating coil can be switched off.

German patent document DE 33 45 958 A1 describes a hydrogen-producing reforming reactor for reforming methanol. Said reforming reactor comprises a burner, where fed-in methanol is burned with air in a start operating phase, thus quickly heating the reforming reactor to an optimal operating temperature.

U.S. Pat. No. 3,982,910 discloses a hydrogen-producing, catalytic reactor for reacting a hydrocarbon with an admixture of air. In a warmup operating phase liquid hydrocarbon and air are fed through a fuel nozzle into the reactor and ignited by a spark plug. Owing to the exothermic combustion reaction, the reforming reactor quickly reaches its operating temperature. It then serves to partially oxidize the evaporated hydrocarbon.

Japanese patent document JP 3-218902 (A) discloses a hydrogen-producing, catalytic reforming reactor for reforming vaporous methanol. The reforming reactor comprises a catalytic burner, where a mixture of methanol vapor and air is burned during a warmup operating phase in order to quickly reach an optimal working temperature for the gas mixture that is to be reformed and is fed into the reforming reactor.

Japanese patent document JP 7-315802 (A) describes a hydrogen-producing, catalytic reforming reactor, with an electric heater comprising resistor elements embedded into the catalyst material in the reforming reactor, and energized with a battery. By operating the heater in a start operating phase, the reforming reactor and its entire reactor volume are supposed to be raised to a temperature that is optimal for the reforming reaction. Similarly, Japanese patent document JP 58-219945 (A) discloses a cylindrical reforming catalyst body with grate-shaped cross sectional structure, whose openings are laced with electric heating wires in order to raise the reaction chamber-forming catalyst body rapidly to the operating temperature.

Published European patent document EP 0 913 357 A1 discloses a class of reactor system which includes a catalyst-coated electric heater, that is permeable to the reaction educt stream and has, for example, a porous or honeycombed structure. It is spaced at a distance from the reaction chamber inlet of a catalyst-coated reaction chamber, which is formed by a catalyst body housed with the heater in a joint housing. As an alternative, the heater can be dispensed with and the catalyst body itself can be designed so as to be electrically heatable. Similar reactor systems with a reaction chamber-forming catalyst body and an electric heater, which is located upstream at a distance, are described in the subsequently published European patent document EP 0 967 174 A1 and British patent document GB 2 268 694 A.

The object of the present invention is to provide a reactor system of the type described above, which has good cold start properties.

This and other objects and advantages are achieved by the reactor system according to the invention, in which the reaction chamber inlet has a flat, electrically heatable, catalyst-coated, and reaction educt stream-permeable heater, which covers at least partially the inlet cross section of the reaction chamber inlet. The educts for reacting the charging material can be fed through the permeable heater, at least in a start operating phase of the reactor system.

In one embodiment of the invention, there is an electric heater in front of the reaction chamber inlet, for heating at least one reaction educt in a start operating phase, and there are means for point-by-point injection of at least one reaction educt, heated in the heater, into the reaction chamber. Thus, the invention facilitates in a start operating phase an especially efficient, fast heating of the reactor system to the operating temperature.

In another embodiment of the invention, the heater has several heating elements, which collectively cover the inlet cross section of the reaction chamber, either totally or partially. In this manner a very small amount of electric energy, distributed over the inlet cross section at several points, will trigger a catalytic combustion reaction. At the same time the resulting heat will spread quickly through the entire reaction chamber owing to thermal conductance.

In still another embodiment of the invention, the heater has a heating disk, which completely covers the inlet cross section of the reaction chamber. In this manner a reactor system is created that can be raised comparatively quickly to the operating temperature in the case of a cold start.

Finally, in yet another embodiment of the invention, the reactor system comprises a switchable reaction educt feed system with feed means, which feed the reaction educt stream to the reaction chamber in a start operating mode, only over one part of the inlet cross section of the same; and in a normal operating mode over the entire inlet cross section. In this manner the feed of reaction educts can be adjusted to the varying requirement in the start operating mode, on the one hand, and in the normal operating mode, on the other hand.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are schematic side views of a first embodiment of a reactor system according to the invention for reacting a hydrocarbon or hydrocarbon derivative charging material in a start operating phase or a normal operating phase; and FIGS. 2, 3, and 4 are schematic side views of other embodiments of reactor systems according to the invention.

DETAILED DESCRIPTION OF THE DRAWINGS

Figure 2:
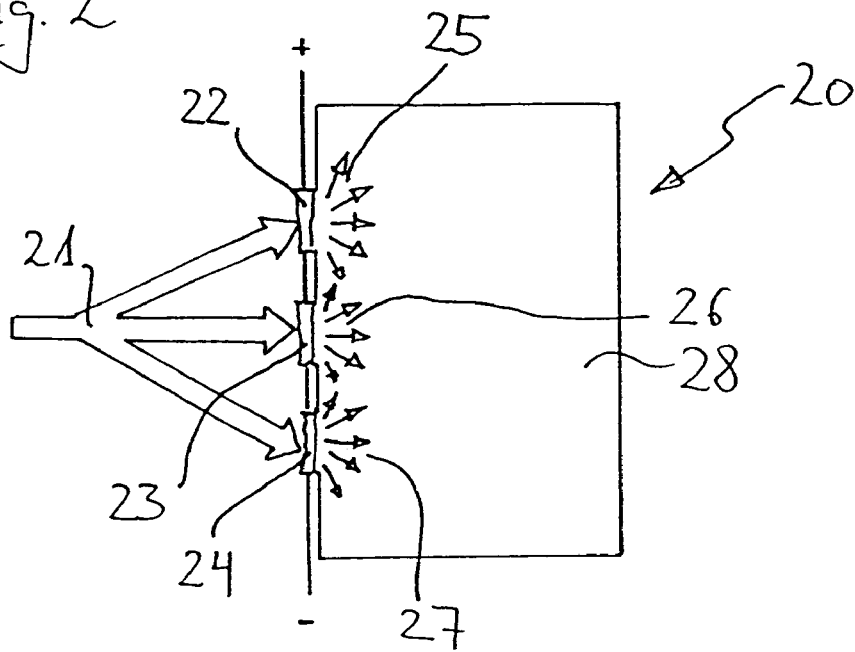

FIG. 1a depicts a reactor system 1 for the purpose of, for example, auto-thermic reforming of a hydrocarbon or hydrocarbon derivative, like methanol, in a start operating phase. The reactor system has a reaction chamber 2, which contains suitable catalyst material (not illustrated in detail). If the catalyst material is exposed to a mixture of air, water and hydrocarbon or hydrocarbon derivative as the reaction educts at a suitable temperature, a catalytic reaction produces an $H_2$-rich gas, which may or may not be used after additional conditioning to operate a fuel cell, for example, for a fuel cell-operated vehicle. For an effective catalytic reaction of the catalyst material it is necessary that the specified minimum temperature be above room temperature.

To raise the cold reaction chamber 2, which is at ambient temperature, rapidly to the operating temperature in the case of a cold start, a reaction educt mixture 3 is fed to the reaction chamber 2 with an electric heater 4, which is permeable for the liquid or gaseous comix stream. The heater 4, in the shape of a plate or disk, which partially covers the inlet cross section 5 for the reaction educts in the reaction chamber 2, is connected by electrical lines 6a, 6b to an electric energy source, such as a vehicle battery (not shown). The heater 4 has a relatively small mass and thus only a small thermal capacity, so that it can be quickly heated with electricity to a desired operating temperature, with relatively little power. Moreover, the heater 4 is coated with a catalyst material that, to the extent the heater 4 has reached its operating temperature, catalyzes an exothermic reaction of the reaction educts flowing through the heater. Thus, a heated mixture of reaction educts, which has already undergone some reaction, is fed to the reaction chamber 2 through the heater. The high temperature of this reaction educt mixture, fed to the reaction chamber, returns, on the one hand, to the heat, electrically generated in the heater 4, and, on the other hand, also releases energy through the exothermic catalytic reaction.

In the outlet region of the heating element 4, the heated and partially already reacted mixture of reaction educts flows into the reaction chamber 2, as indicated with the arrows 7 in FIG. 1a. Thus the reaction chamber 2 exhibits a temperature profile 8, based on the heating element 4 as the heat source at the reaction chamber inlet 9. Starting from the region of the heating element 4 at the reaction chamber inlet 9, the catalyst material, located in the reaction chamber 2, is rapidly heated up so that the catalyst reaction, which was started in the heater 4, continues rapidly. In so doing, heat is transported both through the heat conductance of the solid by means of the catalyst material (and optionally the carrier structures in the reaction chamber 2), and also through the mass flow of the reaction educts or the product gases in the reaction chamber 2. Correspondingly the energy, released in the catalytic reaction, results in the rapid heating of the entire reaction chamber.

FIG. 1b depicts the reactor system 1 in a normal operating phase. To adjust the feed of the reaction educt mixture 3 to the quantity reacted in the reaction chamber 2, the reaction educts are fed over the entire inlet cross section 5 of the reaction chamber 2, when the reaction chamber 2 has reached an optimal operating temperature. In normal operating mode of the reactor system 1, sufficient energy is released in the reaction chamber 2 by the exothermic or auto-thermic reaction that it is no longer necessary to preheat the reaction educts with the heater 4. Therefore, the latter can remain turned off.

FIG. 2 depicts a reactor system 20, whose function corresponds to that of the system in FIGS. 1a and 1b. However, the reactor system 20 has an electric heater that comprises several inlet-sided heating elements 22, 23, 24 in order to feed a reaction educt stream 21 over the reaction chamber inlets 25, 26 and 27 to the reaction chamber 28. In a start operating phase these heating elements 22, 23, 24 are supplied with electric energy, and induce directly the catalytic combustion reaction of the fed-in reaction educts at the reaction chamber inlets 25, 26 and 27, so that the entire reaction chamber 28, located behind the inlets, rapidly heats up to a desired operating temperature. In comparison with the reactor system, depicted in FIGS. 1a and 1b, the corresponding larger heating capacity of the reactor system 20 of FIG. 2 makes it possible to raise the temperature faster to the operating temperature.

Figure 3:
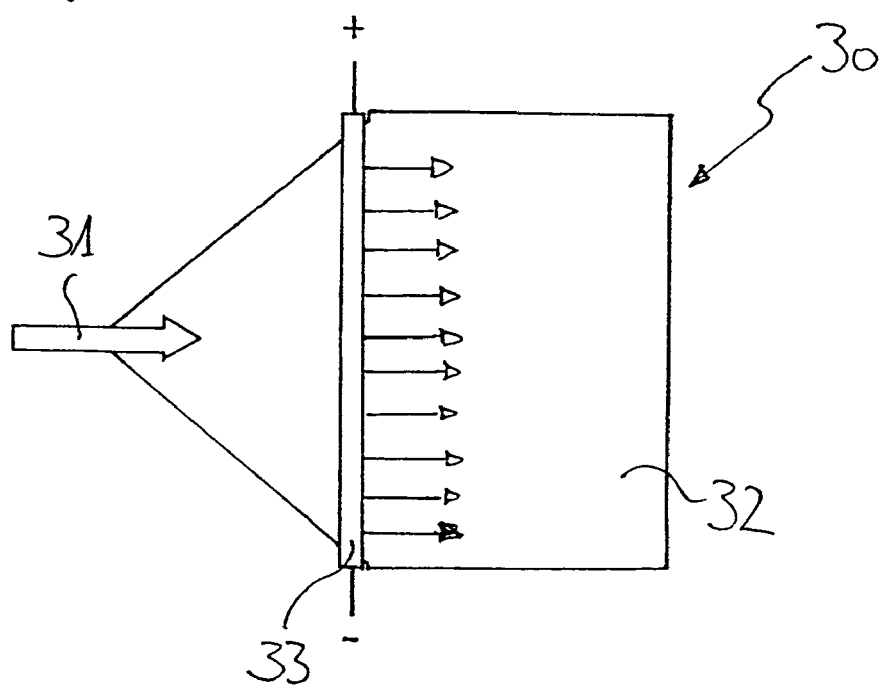

FIG. 3 depicts another embodiment 30 for a reactor system. Here a reaction educt stream 31 is fed into a reaction chamber 32 over a catalyst-coated, electrically heated heating disk 33. In a start operating phase this heating disk 32 is heated with the energy from an electric energy source (not shown) to a temperature that triggers a catalytic reaction of the reaction educts passing through the disk. Compared to the embodiments of FIGS. 1a, 1b, and 2, the reactor system 30 has a greater heating capacity and thus makes it possible to shorten even more the start operating phase.

FIG. 4 depicts a reactor system 40 where, in a start operating phase, one of the reaction educts, namely air, is heated up, while flowing through a feed line 42, with an electric heater 41 in order to be mixed with the hydrocarbon or hydrocarbon derivative charging material 44 in an inlet region 43 of reaction educts in a reaction chamber 45. The resulting reaction educt mixture arrives point-by-point, as shown in one place or alternatively at several places (not shown), at a reaction chamber inlet 46 in the reaction chamber 45. Owing to its heated air content, it has a temperature, which causes, first of all, the fast start of a catalytic combustion reaction of the catalyst material in the region of the air injection site(s) at the reaction chamber inlet 46. As in the case of the reactor systems, depicted in FIGS. 1a and 1b, the point-by-point air stream heat source, starting from the reaction chamber inlet 46, results in a temperature profile, according to which the heat, generated point-by-point on the inlet side, spreads rapidly over the entire reaction chamber 45. In a subsequent normal operating phase, all reaction educts 43, 44 are fed to the reaction chamber 45 over the entire inlet cross section 47. At the same time the electric heater 41 is turned off.

To provide the reaction chamber of the reactor system, described in FIGS. 1a, 1b, 2, 3 and 4, with a stoichiometric mixture of reaction educts, in particular air and hydrocarbon or hydrocarbon derivative, in a start operating phase, it is possible, if desired, to use a battery-operated air compressor. In principle the described reactor systems are also accessible to a temperature control by means of the respective heaters, which contain it. If the temperature in the reaction chamber drops below a specified threshold value, the reaction educts are simply fed over the respective activated electric heaters. In analogy to the operation of the reactor systems in a start operating phase, this brings about a fast increase in temperature. When the desired temperature is reached, the heaters are turned off again. The reactor system includes, if possible, a switchable reaction educt feed system, which contains the controllable feed means. In a start operating mode of the reactor system the reaction educt stream is fed to the reaction chamber over a portion of the inlet cross section. For normal operating mode the reaction educt feed system is switched over, and the reaction educt stream is passed over the entire inlet cross section into the reaction chamber.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A reactor system for reacting a hydrocarbon or hydrocarbon derivative charging material, comprising:
    a catalyst-coated reaction chamber having a reaction chamber inlet for accommodating a flow of a reaction educt stream; and
    an electric heater arrangement through which educts for reacting the charging material can be fed at least in a start operating phase of the reactor system;
    wherein, said heater arrangement comprises a plurality of physically separated, individual heating elements which are disposed at respective reaction chamber inlet openings upstream of said reaction chamber, each of said heating elements being formed by a catalyst coated reaction, educt stream permeable material and at least partially covering one of said inlet openings, said heating elements accommodating a discrete point-by-point injection of heated reaction educt material into the reaction chamber.

2. The reactor system, as claimed in claim 1, wherein the heater has a plurality of heating elements, which together cover the cross section of the reaction chamber inlet, at least partially.

3. The reactor system, as claimed in claim 1, wherein the heater has a heating disk, which completely covers the inlet cross section of the reaction chamber.

4. The reactor system, as claimed in claim 1, wherein the reactor system comprises a switchable reaction educt feed system with feed means which feed the reaction educt stream in a start operating mode into the reaction chamber only over one part of the inlet cross section and in a normal operating mode into the reaction chamber over the entire inlet cross section.

5. A reactor system for reacting a hydrocarbon or hydrocarbon derivative charging material, comprising:
    a catalyst-coated reaction chamber having a reaction chamber inlet for feeding a reaction educt stream into said reaction chamber; and
    an electric heater located in front of the reaction chamber inlet for heating at least one reaction educt in a start operating phase; wherein,
    the electrical heater includes means for point-by-point injection of at least one reaction educt, heated in the heater, into the reaction chamber at at least one place within the reaction chamber inlet cross section; and
    the reactor system comprises a switchable reaction educt feed system with feed means which feed the reaction educt stream in a start operating mode into the reaction chamber only over one part of the inlet cross section and in a normal operating mode into the reaction chamber over the entire inlet cross section.

* * * * *